(No Model.)
J. W. CONDON.
BEATER AND MIXER FOR CONFECTIONERS' USE.
No. 449,463. Patented Mar. 31, 1891.
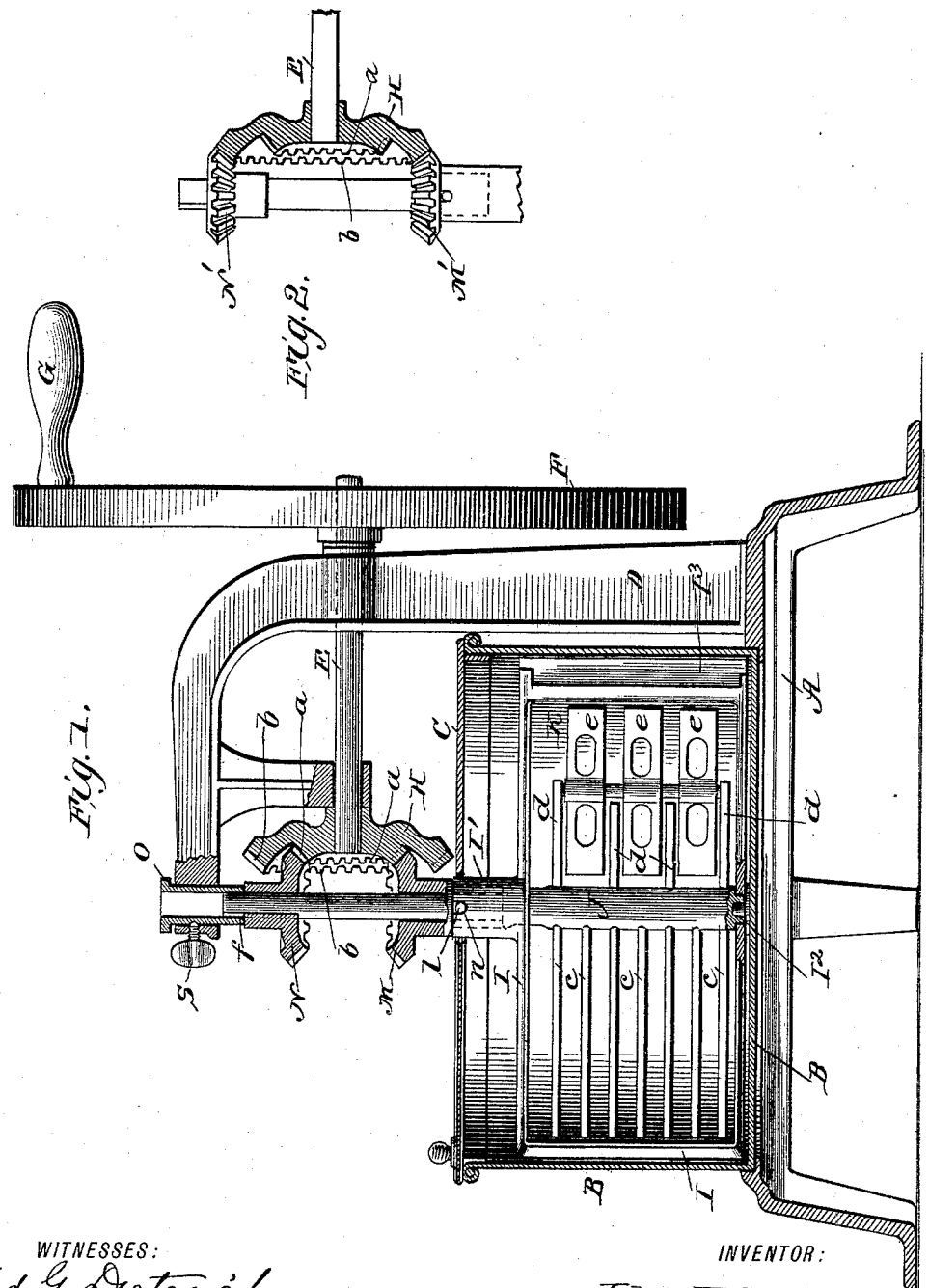

UNITED STATES PATENT OFFICE.

JOHN W. CONDON, OF ROCHESTER, INDIANA.

BEATER AND MIXER FOR CONFECTIONERS' USE.

SPECIFICATION forming part of Letters Patent No. 449,463, dated March 31, 1891.

Application filed August 7, 1890. Serial No. 361,388. (No model.)

*To all whom it may concern:*

Be it known that I, JOHN W. CONDON, of Rochester, in the county of Fulton and State of Indiana, have invented a new and useful Improvement in Beaters and Mixers for Confectioners' Use, of which the following is a specification.

The object of my invention is to provide a universal beater and mixer for the use of confectioners. In beating whites of eggs a very high speed is required for the revolving beaters. For whipping cream a rapid motion is needed in the center of the cylinder and a slow motion at the circumference. In mixing icing and pound-cake a low speed is needed, and in mixing jelly-roll and sponge-cake an intermediate speed is used.

My invention is designed to provide a single machine which may be adapted in an economical way to these different uses; and it consists in the peculiar construction of the driving-gears, in combination with the mixing and beating devices, which I will now proceed to fully describe.

Figure 1 is a vertical central section of my improved beater and mixer, and Fig. 2 a detail of two of the substitute gears shown in connection with the larger series of teeth of the driving-gear.

A represents the cast-iron base mounted upon legs. Within the raised edge of this base is sustained a circular galvanized-iron pan B with cover C. Upon the base outside the pan is mounted an upright or standard D, carrying bearings for a horizontal shaft E, which is driven by a fly-wheel F and crank G or by a power-pulley. On the end of the shaft E, opposite the fly-wheel, is rigidly mounted a saucer-shaped wheel H, having two rows of bevel-teeth $a$ and $b$ of different diameters and also occupying different vertical planes.

I and J represent the beating and mixing devices. These consist of a rectangular frame I, of galvanized iron, having a central hub I' at the top, a step-bearing I² at the bottom, and a scraper I³ at one side to scrape the side of the pan. Within the hub I', at the top and in a step-bearing of the frame I at the bottom, there revolves a beater-shaft J, which has upon one side a series of long radially-projecting teeth $c$ and upon the other side a series of short radially-projecting teeth $d$, in the top and bottom ones of which is pivoted to revolve a freely-turning stirrer K, whose blades $e$ pass between the teeth $d$ and also act as beaters and mixers. The frame I has a positive revolution in one direction and the shaft J and its parts have a positive revolution in the opposite direction by the well-known use of bevel-gears, while the freely-revolving stirrer K is not driven about its axis, but turns passively in the material in which it is submerged with a revolution which is caused by the fact that the blades $e$ encounter a greater resistance on the outer half of their independent rotation (near the pan) than they do through the inner half of their independent rotation, (near the central shaft.) This automatic stirrer, throwing the contents of the pan from center to circumference and from circumference to center again, renders the mixture homogeneous in density and weight and prevents the separation of the mass into layers from centrifugal action. This form of passively-rotating stirrer has been used before, and I make no claim to it broadly. In the present invention, however, the blades of this passively-rotating stirrer pass between the teeth $d$ of the beater-shaft and are caused to subserve thereby the further useful function of beating and mixing more effectually.

To impart a reversed rotary motion to the frame I and beater-shaft J, the following means are employed: The hub I' of the frame I is formed with a notch $n$ to receive the lug $l$ of a detachable bevel-gear M, whose hub is long enough to raise the teeth up to the level of the smaller row $a$ of bevel-teeth on the double gear, and the diameter of which gear M is great enough to cause its teeth to penetrate the hollow of the double gear and to mesh with the smaller series of gear-teeth therein. This gear M surrounds the beater-shaft and has a sleeve that drops within the hub I' of frame I, and when the lug $l$ is in notch $n$ motion is transmitted from the smaller row of teeth $a$ to the frame I, causing it to rotate in a given direction and at a given speed. To change this speed, a new bevel gear-wheel M' is substituted for M. M' has a shorter hub and also a smaller diameter, so as to throw its teeth into engagement with the larger series of teeth *b* of the double bevel-gear. This causes the frame I to be revolved at a greatly-increased speed.

To rotate the beater-shaft, a detachable bevel-gear N is connected to its upper end by a feather and groove *f*, the upper end of the shaft being carried in a detachable socket-bearing O, which is held in the end of the supporting-arm by a set-screw S. The hub of this bevel-gear N is arranged above its teeth, so as to throw its teeth into the plane of the series *a* of the double bevel-gear. To change speed, the socket-bearing O is removed and the gear N is taken off and another N' is put in its place. This gear N' has its hub below the teeth and is also made of a smaller diameter, so as to bring its teeth into engagement with the larger series *b* of the double bevel-gear.

As the two detachable gears are upon opposite sides of the double bevel-gear, it will be seen that the beater-shaft and the frame I are revolved in opposite directions. By adjusting the detachable gears so as to make them both run upon the inner series of teeth *a* or the outer series of teeth *b* an increased or decreased speed may be obtained with the same relative speed to each other, while by changing the detachable gears, so that one runs upon one series *a* and the other upon the other series *b*, not only an increased or diminished speed for one may be obtained, but a different relative speed to each other. These adaptations permit of a very wide range of application in the confectioners' art. It is well adapted to making Charlotte russe and avoids the necessity for having different machines for the different materials with the incidental necessity of cleaning these different machines and cost of maintaining the same.

I am aware that it is common in beaters and mixers to accomplish a duplex rotation in opposite direction by bevel-gears, and that a bevel-gear with a double row of teeth is not broadly new, and I do not claim this.

Having thus described my invention, what I claim as new is—

1. The combination, with the reversely-revolving shaft and frame of a beater and mixer, of a drive-shaft provided with a bevel-gear having a double row of teeth of different diameters and in different planes, and interchangeable sets of bevel-gears detachably locked to said frame and shaft and having their hubs and diameters of variable dimensions adapted to the series of teeth of the double bevel-gear, substantially as shown and described.

2. The revolving beater and mixer consisting of a cam or cylinder, a revolving frame I, and a central shaft having a vertical series of arms or teeth *d*, and a vertically-arranged and freely-revolving stirrer K, journaled in the upper and lower arms *d* and provided with radial blades *e*, arranged to pass between the arms *d*, substantially as shown and described.

JOHN W. CONDON.

Witnesses:
 JOHN P. WALTER,
 ANTHONY C. SCHROEDER.